US008931259B2

(12) United States Patent
Yan et al.

(10) Patent No.: US 8,931,259 B2
(45) Date of Patent: Jan. 13, 2015

(54) REDUCTANT DELIVERY APPARATUS WITH PURGING MEANS

(76) Inventors: Mi Yan, Columbus, IN (US); Baohua Qi, Columbus, IN (US)

( * ) Notice: Subject to any disclaimer, the term of this patent is extended or adjusted under 35 U.S.C. 154(b) by 162 days.

(21) Appl. No.: 13/602,195

(22) Filed: Sep. 2, 2012

(65) Prior Publication Data

US 2013/0055701 A1 Mar. 7, 2013

Related U.S. Application Data

(60) Provisional application No. 61/573,295, filed on Sep. 2, 2011.

(51) Int. Cl.
*F01N 3/00* (2006.01)
*F01N 3/20* (2006.01)

(52) U.S. Cl.
CPC ......... *F01N 3/208* (2013.01); *F01N 2610/1466* (2013.01); *Y02T 10/24* (2013.01)
USPC ................................. 60/286; 60/295; 60/301

(58) Field of Classification Search
CPC .. F01N 3/208; F01N 2610/1466; Y02T 10/24
USPC .................................................. 60/272–324
See application file for complete search history.

(56) References Cited

U.S. PATENT DOCUMENTS

| 3,647,394 | A | * | 3/1972 | Wetch et al. ................... 422/112 |
| 3,716,996 | A | * | 2/1973 | Maruoka .......................... 60/286 |
| 3,908,371 | A | * | 9/1975 | Nagai et al. ..................... 60/301 |
| 5,544,483 | A | * | 8/1996 | Heuer .............................. 60/283 |
| 7,497,075 | B2 | | 3/2009 | Ripper et al. |
| 7,707,825 | B2 | | 5/2010 | Dingle et al. |
| 8,069,655 | B2 | * | 12/2011 | Carroll et al. ................... 60/286 |
| 2009/0301067 | A1 | | 12/2009 | Dingle et al. |
| 2010/0122521 | A1 | | 5/2010 | Sun et al. |
| 2010/0170225 | A1 | * | 7/2010 | Opris et al. ..................... 60/286 |
| 2010/0212290 | A1 | | 8/2010 | Thiagarajan |

* cited by examiner

*Primary Examiner* — Jesse Bogue

(57) ABSTRACT

A dosing apparatus with purging means for delivering reductant into an exhaust gas treatment system of an internal combustion engine. The apparatus includes a first Venturi T connector with two high pressure ports and a low pressure port, and a purge control valve for switching from normal dosing to purging by controlling flow through the two high pressure ports. The apparatus may also include a second Venturi T connector and a reductant supply chamber for purging reductant residue in its pump and reductant passage lines. The apparatus may further include a purging controller that triggers a purging event according to engine oil or coolant temperature and controls the purging process after a dosing process completes.

15 Claims, 6 Drawing Sheets

| | Pin 501 (input-purge enable) | Pin 502 (input-shutoff valve control enable) | Pin 503 (input-pump control enable) | Pin 504 (input-injector control enable) | Rt > Rthd (Temp. < Tthd) | Pin 505 (shutoff valve control) | Pin 506 (pump control) | Pin 507 (injector control) |
|---|---|---|---|---|---|---|---|---|
| Circuit control mode | HIGH/HZ | LOW/HZ | LOW/HZ | LOW/HZ | TRUE | LOW | LOW | LOW |
| | HIGH/HZ | LOW/HZ | LOW/HZ | LOW/HZ | FALSE | HIGH | LOW | LOW |
| | HIGH/HZ | LOW/HZ | LOW/HZ | LOW/HZ | RISING EDGE | FALLING EDGE | PULSE | PULSE |
| | HIGH/HZ | LOW/HZ | LOW/HZ | LOW/HZ | FALLING EDGE | RISING EDGE | LOW | LOW |
| DCU control mode | LOW | HIGH/LOW | HIGH/LOW | HIGH/LOW | X | = Pin 502 | = Pin 503 | = Pin 504 |

FIG. 6

REDUCTANT DELIVERY APPARATUS WITH PURGING MEANS

This present application claims priority from U.S. provisional application No. 61/573,295 having the same title as the present invention and filed on Sep. 2, 2011.

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

FIELD OF THE INVENTION

The present invention relates to a dosing apparatus for delivering reducing agent (reductant) into an exhaust gas treatment system of an internal combustion engine.

BACKGROUND OF THE INVENTION

Environmentally harmful species in the exhaust gas emitted from an internal combustion engine, such as hydrocarbons (HC), carbon monoxide (CO), particulate matters (PM), and nitric oxides (NOx) are regulated species that need to be removed from the exhaust gas. In lean combustion engines, due to the existence of large amount oxygen excess, passive means without extra dosing agents, such as that using a three-way catalyst, normally are not able to effectively remove the oxidative specie NOx as that in most of spark-ignition engines. To reduce NOx in lean combustion engines, a variety of active means with reducing agents (reductants) being dosed in exhaust gas are developed. In these technologies, normally the reductant is metered and injected into the exhaust gas, and the result mixture flows into a SCR (Selective Catalytic Reduction) catalyst, where the reductant selectively reacts with NOx generating non-poisonous species, such as nitrogen, oxygen, carbon dioxide, and water.

A variety of reductants, such as ammonia (NH3), HC, and hydrogen (H2) can be used in SCR systems. Among them, ammonia SCR is used most broadly due to high conversion efficiency and wide temperature window. Ammonia can be dosed directly. However, due to safety concerns and difficulties in handling pure ammonia, normally urea solution is used in ammonia SCR systems. Urea can be thermalyzed and hydrolyzed to ammonia in exhaust gas.

Reductants can be frozen under low temperature. For example, urea solution of 32.5% wt has a freezing temperature of −11° C. Therefore, in applications under low temperature, a temperature control is needed to maintain the working temperature above freezing point. Also, since frozen reductant may damage the mechanical components in a dosing apparatus, such as the pump and the injector, and the temperature control normally is turned off after dosing finishes, in order to protect the dosing apparatus, reductant residue in the mechanical components needs to be purged before they are exposed to low temperature for a long time. Additionally, in the temperature control, typically the reductant tank has a closed-loop heating control with a heater and a temperature sensor positioned in the reductant tank. However, for reductant passage lines, due to distributed heating, it is difficult to control temperature in closed loop and locally over-heating could damage the lines. To reduce the requirement for line heating performance and to increase the system reliability, reductant residue in the reductant passage lines also needs to be purged after a dosing process completes.

Normally, in a dosing apparatus, the pump is unidirectional. However, during purging, since most of the reductant residue in the dosing apparatus needs to be drawn back to the reductant tank to avoid urea deposit and crystallization in the exhaust pipe, to which the dosing apparatus is fluidly connected, a reverse reductant flow needs to be created, and a complex flow control is then required. For example, a method for reverting flow is swapping the inlet of the pump with the outlet. This method involves multiple flow changes, and since partial flow change would create a fluid loop with the inlet fluidly connected to the outlet, resulting in purging failures, in addition to being able to swap the pump inlet with outlet, the system design and purge control should also avoid the fluid loop from happening. Additionally, during purging, since the injector nozzle needs to be opened when the reductant residue in the injector is drawn back to the reductant tank, high temperature air in the exhaust pipe could come into the dosing apparatus, causing damage when it passes through the pump. To avoid this problem, before purging, the air temperature at the injector nozzle needs to be examined. However, after dosing completes, normally the engine is keyed off as well. Without exhaust flow, it is difficult to obtain an accurate temperature at the injector nozzle due to temperature distribution in the exhaust pipe. Furthermore, when air goes into the pump, the pumping efficiency drops significantly. It is also difficult to clean the passage lines, especially the passage line connected to the injector, which normally is the longest passage line in the dosing apparatus.

To effectively purge reductant residue, a primary object of the present invention is to provide a dosing apparatus with a purging means having a simple control that needs not create a reverse flow through the pump or use other fluid such as compressed air to push out the reductant residue into the exhaust pipe.

A further object of the present invention is to provide a purging means pulling back the reductant residue with a constant drawing pressure.

Another object of the present invention is to provide a purging control means that controls purging after a dosing process completes.

BRIEF SUMMARY OF THE INVENTION

The present invention provides a dosing apparatus with a purging means that draws reductant residue in the dosing apparatus back to reductant tank after a dosing process completes. In an embodiment of the present invention, a Venturi T connector is used to draw back reductant residue in an injector, a buffer without return loop to reductant tank, and a reductant passage connected in between the buffer and the tank. The low pressure port of the Venturi T connector is fluidly connected to the buffer. One high pressure port of the Venturi T connector is fluidly connected to a pump and the other high pressure port is fluidly connected to a purge control valve. During normal dosing, the purge control valve is off, and the pump drives reductant through the low pressure port to the buffer. After the dosing process completes, the purge control valve is de-energized open, and thereby reductant flows through the two high pressure ports, drawing reductant from the buffer via the low pressure port.

In another embodiment of the present invention, a Venturi T connector is used to draw back reductant residue in an injector, a buffer with a return loop to reductant tank, and a reductant passage connected in between the buffer and the tank. The return loop has an optional pressure relief valve and a check valve inside. The check valve is fluidly connected in parallel with the pressure relief valve for allowing reductant flowing back from the return loop to the buffer. The Venturi T connector has its low pressure port fluidly connected to the buffer. One high pressure port of the Venturi T connector is fluidly connected to a pump and the other high pressure port is fluidly connected to a control valve. During normal dosing, the purge control valve is closed, and the pump drives reductant through the low pressure port to the buffer. And the return loop provides a pressure releasing means facilitating reductant pressure control. After the dosing process completes, the purge control valve is de-energized open, and thereby reductant flows through the two high pressure ports, drawing reductant from the buffer via the low pressure port. The pressure relief valve in the return loop simplifies reductant pressure control and provides a means holding reductant pressure without keeping pump running. The normally open (NO) control valve releases buffer pressure in an emergent power off and thereby a safety issue with the pressure relief valve is resolved.

To further draw reductant remains in the pump and other reductant passage lines, in another embodiment of the present invention, a reductant tank is separated into a reductant supply chamber, which is used for providing reductant to the pump, and a reductant storage chamber. The reductant supply chamber is fluidly connected to the low pressure port of a Venturi T connector, and one high pressure port of the Venturi T connector is fluidly connected to the reductant storage chamber. The other high pressure port of the Venturi T connector is fluidly connected to the purge control valve. During normal dosing, the purge control valve is closed, and reductant flows from the storage chamber to the supply chamber via the high pressure port fluidly connected to it and the low pressure port of the Venturi T connector. When the dosing process completes, the purge control valve is de-energized open. Thereby a flow is created through the two high pressure ports of the Venturi T connector, pulling reductant from the supply chamber to the storage chamber. When the reductant in the supply chamber depletes, air enters the pump, purging reductant residue in the pump and passage lines into the storage chamber.

The present invention also provides a purging controller that triggers a purging event according to engine oil or coolant temperature, and controls the purging process. When engine oil or coolant temperature is lower than a threshold, a purging signal is generated. The purge control valve is then de-energized open, and the pump is run at a certain rate for a period of time while the injector is energized open. Using engine oil or coolant temperature to trigger purging avoids re-establishing pressure when key-off time is short, and thus helps improving emission performance for applications with frequent and short key cycles, such as that in a vehicle with frequent stops and goes.

BRIEF DESCRIPTION OF THE DRAWINGS

FIG. 6 is a table that lists logic states in a purging control circuit of FIG. 5.

DETAILED DESCRIPTION OF THE INVENTION

Figure 1:
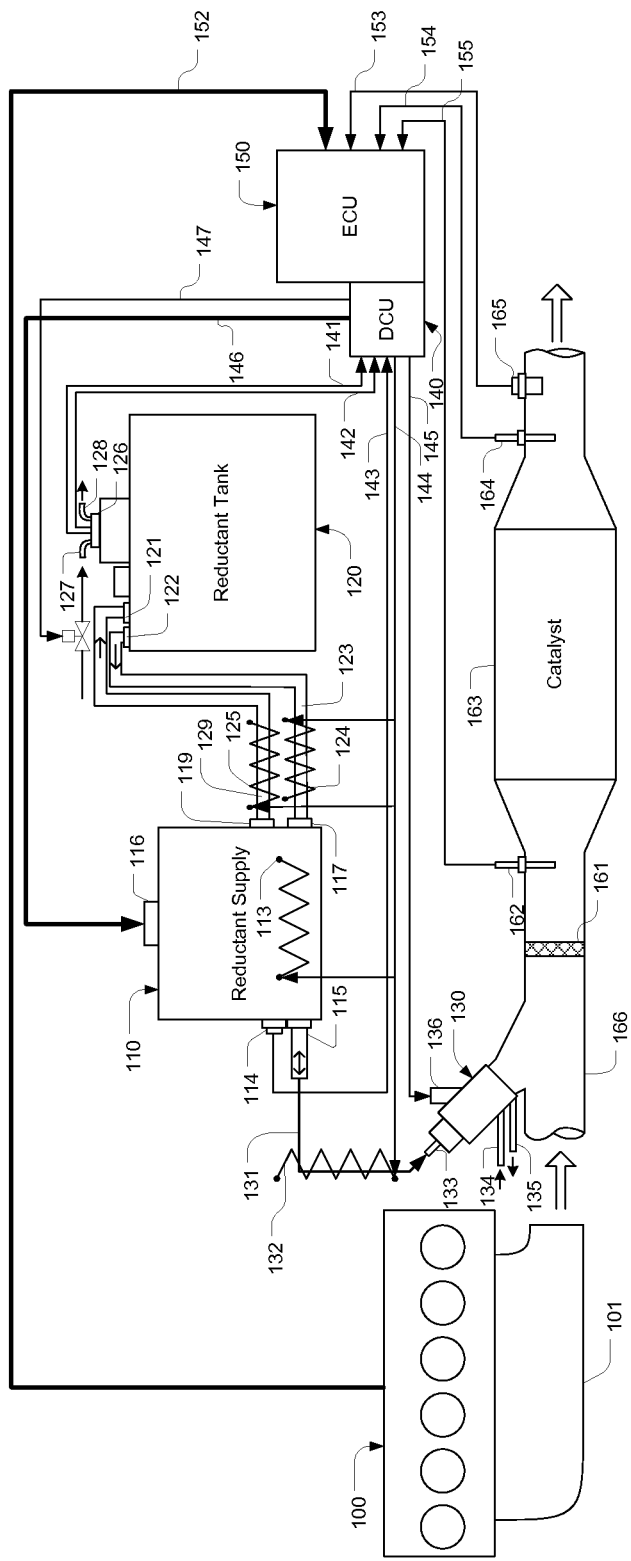
FIG. 1 is a schematic representation of an internal combustion engine with an exhaust gas treatment system.

Referring to FIG. 1, in an engine exhaust gas treatment system, exhaust gas generated in an engine 100 enters a passage 166 through a manifold 101. On the passage 166, a reductant injector 130 is installed. In an airless dosing system or an air-driven dosing system, in which reductant pressure is controlled in a common rail and reductant dosing amount is controlled by adjusting the open time of a nozzle fluidly coupled to the common rail, the solenoid valve of the injector 130 is controlled by a Dosing Control Unit (DCU) 140 through signal lines 145 electrically connected to a port 136, while in an air-assisted dosing system, in which reductant dosing rate is controlled with a metering pump, the injector has just a nozzle without active control means. Reductant to be injected by via the injector 130 is provided by a reductant supply module 110 through a reductant passage line 131 fluidly connected to a port 133. In a dosing system with active injector control, to avoid damages caused by high temperature exhaust air to the solenoid valve in the injector 130, engine coolant is cycled from an inlet port 134 to an outlet port 135. The reductant injected from the injector 130 mixes with exhaust gas, and through a mixer 161, the result gas enters a catalyst 163, where SCR reactions remove NOx from the exhaust air.

The reductant supply module 110 has a port 115 fluidly connected to the port 133 of the injector 130 with the reductant passage 131 for providing pressurized reductant supply to the injector. In a dosing system with reductant pressure control, a pressure sensor (not shown in FIG. 1) reports pressure value inside the reductant module to the DCU through signal lines 143 electrically connected to a port 114, and reductant pressure inside the reductant supply is controlled by the DCU through signal lines 146 electrically connected to a port 116. The reductant supply module draws reductant from a reductant tank 120 via a port 117, a reductant passage line 123, and a port 122 of the reductant tank, and returns reductant back to the tank through a port 119, a reductant passage line 129, and a port 121 of the tank.

A tank level sensor and a temperature sensor report, respectively, the reductant level and temperature inside the reductant tank 120 to the DCU through signal lines 141 and 142, which are electrically connected to a port 126. And the reductant tank is heated by engine coolant cycling through an inlet port 127 and an outlet port 128. The engine coolant flow is controlled by a solenoid shutoff valve 127 commanded by the DCU through signal lines 147. In order to work under low ambient temperature, electrical heaters 113, 132, 124, and 125 commanded by the DCU 140 with signal lines 144 are used, respectively, to thaw frozen reductant in the reductant supply module 110 and the reductant passage lines 131, 123, and 129, and maintain temperature above reductant freezing point.

Commands of reductant dosing rates to the DCU are generated in an ECU 150 according to the catalyst inlet exhaust temperature reported by a sensor 162 through signal lines 155, the catalyst outlet temperature reported by a sensor 164 through signal lines 154, the catalyst outlet NOx concentration obtained from a sensor 165 through communication lines 153, and the sensing values, such as engine state, coolant and oil temperature, engine speed, fueling rate, exhaust flow rate, NOx rate, and NO2/NOx ratio, obtained from sensors in the engine 100 via signal lines 152, or calculated by the ECU 150 with the sensing values.

Normally after key-off, reductant heating is off. When ambient temperature is lower than the reductant freezing point, if reductant still remains in the reductant supply module and reductant passage lines, the dosing system could be damaged by frozen reductant. Compared to an air-assisted dosing system, in which the injector 130 only has a nozzle without active control means and reductant pressure is not controlled, an airless or air-driven dosing system, which has both common rail pressure control and injector solenoid control, is more vulnerable to reductant remains, due to the high reductant pressure maintained in its common rail or buffer. In an air-assisted dosing system without pressure control, the most vulnerable part to frozen reductant is the metering pump, while in an airless or air-driven system with pressure control, both of the injector and pump could be damaged by frozen reductant, especially when pressure in its common rail is not released after key-off.

Thawing frozen reductant residue in the reductant supply module and reductant supply lines also make heating control more complex. For reductant tank heating, as depicted in FIG. 1, normally a coolant flow loop together with a urea temperature sensor is installed in the reductant tank. Coolant heating needs not to drain battery current, and therefore, is not limited to battery conditions. For the heating of the reductant supply lines and reductant supply module, however, normally electrical heating rather than coolant heating is used due to difficulties in controlling coolant flow and the concerns of overheating since only small amount of reductant is in the reductant supply module and reductant supply lines. Electrical heating for thawing frozen reductant needs to drain a large current from the battery, and since battery capacity decreases with temperature, the heating needs to be carefully monitored by the DCU to avoid battery issues. Furthermore, the heating for the reductant passage lines by nature is distributed, resulting in a temperature distribution along the reductant passage lines. It is difficult to use a closed loop control for the line heating, while locally over-heating could damage the lines.

To decrease the effects caused by frozen reductant, reductant residue in the reductant supply module and passage lines needs to be purged after a dosing process completes. Normally, referring to FIG. 1, the reductant supply module 110 is positioned close to or inside the reductant tank 120, thereby the reductant passage line 131 is much longer than the reductant passage lines 129 and 123. With the concerns of damages caused by frozen reductant under high pressure and difficulties in line heating control due to temperature distribution along the line, purging reductant in the common rail or buffer and the reductant passage line 131, therefore, is the most important in protecting the dosing system under low temperature.

Figure 2:
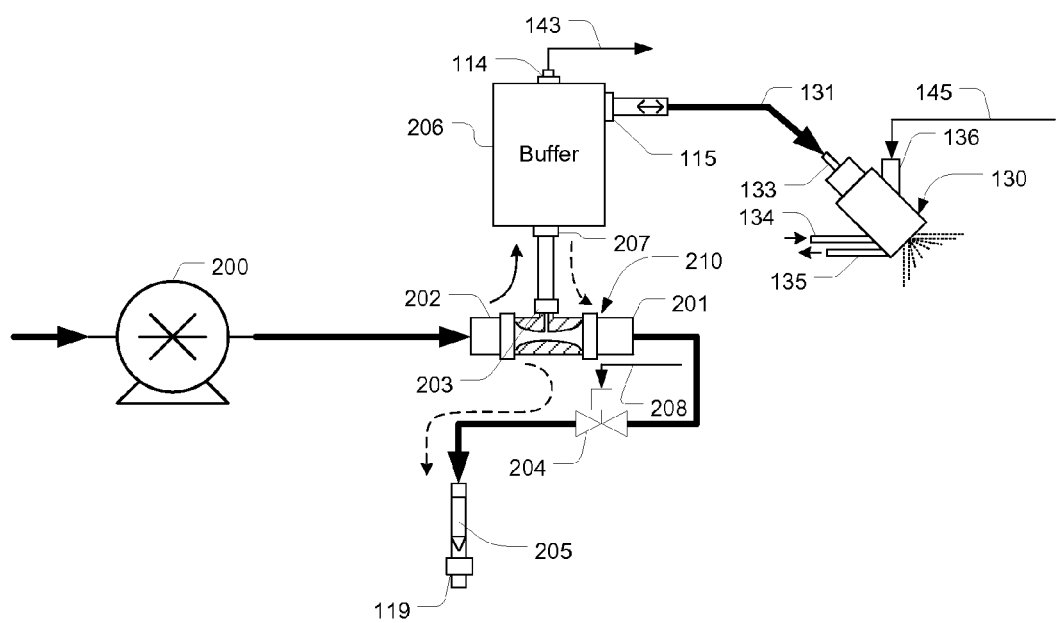
FIG. 2 depicts a dosing apparatus with a purging means that uses a Venturi T connector to draw reductant residue in an injector, a buffer without return loop to reductant tank, and a reductant passage fluidly connected in between the buffer and the injector.

Referring to FIG. 2, in a common-rail dosing system, a pump 200 delivers reductant to a buffer 206 via a Venturi T connector 210. Under the pressure provided by the pump 200, reductant flows to a high pressure inlet port 202 of the Venturi T connector 210, which has another high pressure outlet port 201 fluidly coupled to the return port 119 through a shutoff valve 204 and a nozzle 205 that limits the flow rate of retuning reductant, and a low pressure port 203 fluidly connected to an inlet port 207 of the buffer 206. The shutoff valve 204 is controlled by the DCU through signal lines 208, and the pressure inside the buffer 206 is obtained the DCU 140 via signal lines 143 electrically connected to the port 114.

The shutoff valve 204 is a normally open (NO) valve, i.e., the shutoff valve is closed when energized. During normal dosing, the shutoff valve is closed, thereby the pump drives reductant into the buffer 206 via the high pressure inlet port 202 and the low pressure outlet port 203 of the Venturi T connector 210, and the buffer supplies pressurized reductant to the injector 130 through the port 115. Reductant pressure inside the buffer is controlled by the DCU 140: whenever the pressure is low, the DCU commands the pump providing more reductant to build up the pressure. When the dosing process completes, the shutoff valve 204 is de-energized open, and the pump is commanded running at a certain rate, driving reductant flow back to the tank via the high pressure inlet port 202 and the high pressure outlet port 201 of the Venturi connector 210, the shutoff valve 204, the nozzle 205, and the port 119. The injector 130 is then energized open, and under Venturi effect, reductant in the buffer, the reductant passage line 131, and the injector 130 is pulled back through the low pressure port 203 of the Venturi connector 210, joining the reductant return flow through the two high pressure ports 201 and 202. After purging, the pump 200 is commanded off and the injector 130 is de-energized.

Figure 3:
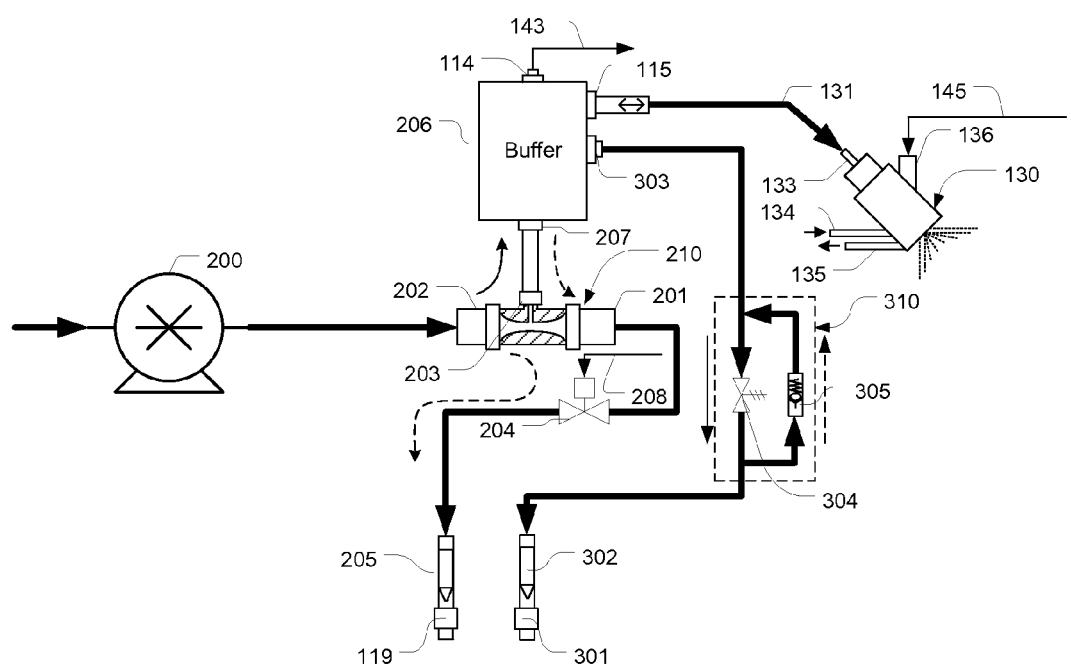
FIG. 3 shows a dosing apparatus with a purging means that uses a Venturi T connector to draw reductant residue in an injector, a buffer with a return loop to reductant tank, and a reductant passage fluidly connected in between the buffer and the injector.

To better control the pressure in the buffer during dosing, referring to FIG. 3, a reductant return loop from a port 303 on the buffer 206, to the reductant tank through an optional pressure control unit 310, a nozzle 302, and a port 301, can be used to release reductant in the feedback control (the reductant passage line from the port 301 to the tank is not shown in FIG. 1 and FIG. 3). The pressure control unit has a pressure relief valve 304 and a check valve 305 inside. When the pressure inside the buffer is higher than the threshold pressure of the pressure relief valve 304, reductant in the buffer flows back to the tank 120, releasing the extra pressure inside the buffer, and the relieving flow rate is limited by the nozzle 302. The check valve opens only when the reductant residue in the reductant passage line connected in between the port 301 and the tank 120 is drawn back to the tank via the buffer 206. In this apparatus, when a dosing process completes, upon the opening of the shutoff valve 204, driven by the pump 200, the reductant flows through the two high pressure ports 202 and 201 of the Venturi T connector 210, pulling via its low pressure port 203 the reductant residue in the buffer 206 and reductant passage lines in the path from the port 301 to the tank 120, and pulling the reductant in the reductant passage line 131 and the injector 310 when the injector is energized open. After purging, the pump 200 is stopped and the injector 130 is de-energized.

Figure 4:
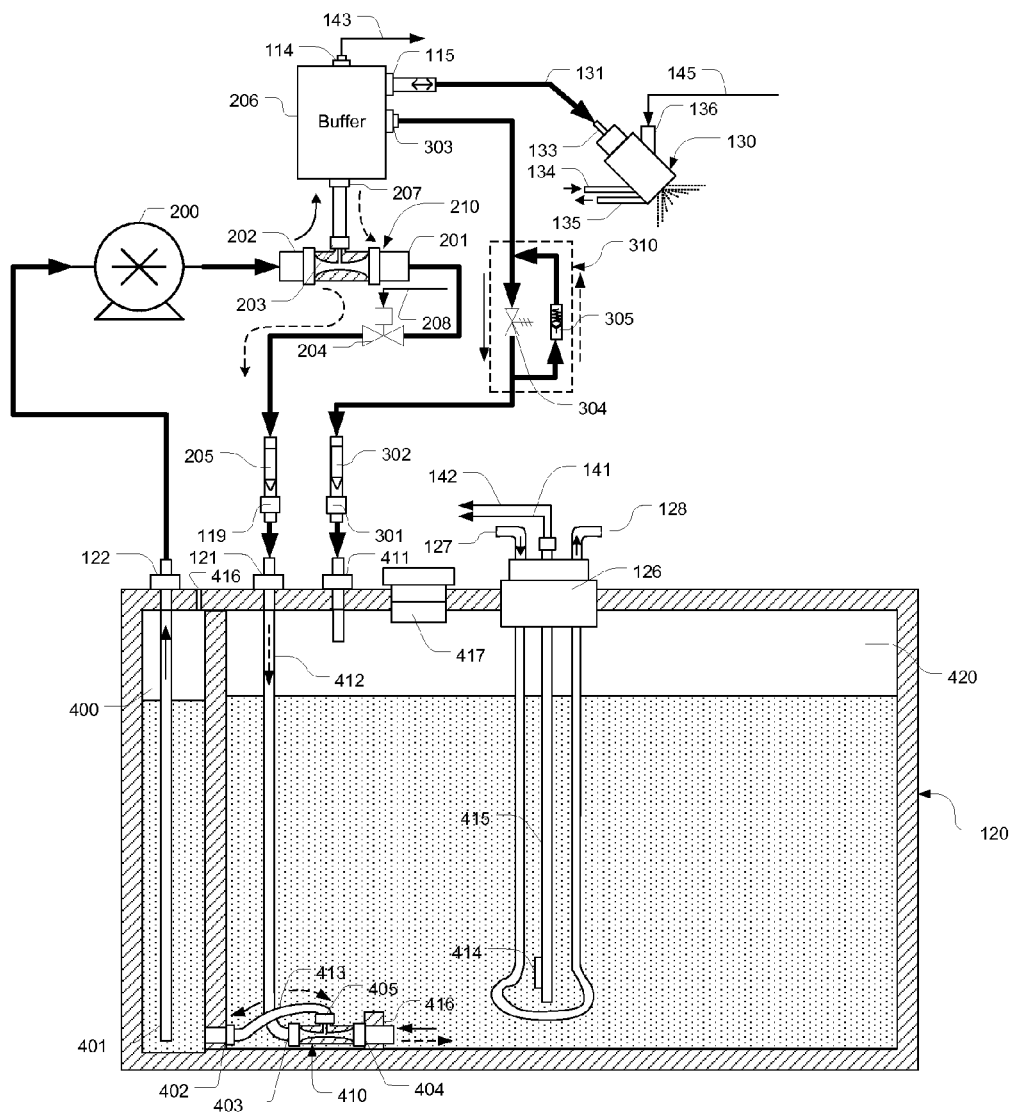
FIG. 4 is diagrammatic and cross-sectional illustration of a dosing apparatus with a purging means that uses two Venturi T connectors to draw reductant residue in the whole dosing apparatus including a pump, an injector, a buffer with a return loop to reductant tank, and reductant passage lines.

To further purge the reductant residue in the pump 200, the reductant supply passage line 123, and the reductant return line 129 (FIG. 1), referring to FIG. 4, the reductant tank 120 is separated into a reductant supply chamber 400 and a reductant storage chamber 420. The reductant supply chamber 400 is used to provide reductant to the pump 200 via a passage 401 inside the chamber, the port 122, and the reductant passage line 123. On the top of the chamber 400, a vent 416 releases pressure built by reductant vapor, while adjacent to the reductant supply chamber 400, the reductant storage chamber 420 has the coolant heating tube with the inlet port 127 and the outlet port 128 positioned inside. A reductant level sensor 415 and a temperature sensor 414 report sensing values to the DCU 140 through the lines 141 and 142 respectively. And on the top of the chamber 420, a cap 417 with a vent (not shown) is used for refilling reductant to the tank and releasing pressure built by reductant vapor. The chamber 420 is also fluidly connected to the reductant return port 301 via a port 411, and through a passage 412, the other return port 121 is fluidly connected to a high pressure port 403 of a Venturi T connector 410, which is fixed on the bottom of the chamber 420 by a retainer 416. Another high pressure port 404 of the Venturi T connector 410 is fluidly connected to the chamber 420, while a low pressure port 405 of the Venturi T connector 410 is fluidly connected to the chamber 400 through a passage 413 and a port 402.

During dosing, the shutoff valve 204 is closed and thereby when the pump 200 draws reductant from the chamber 400, creating a reductant level difference between the chamber 400 and the chamber 420, reductant flows via the high pressure port 404 and the low pressure port 405 of the Venturi T connector 410, the passage 413, and the port 402, into the chamber 400 under the pressure caused by the level difference, compensating reductant loss in the chamber 400. When the dosing process completes, the shutoff valve 204 is de-energized open, and the pump 200 runs at a certain rate, generating a flow through the nozzle 205, the port 119, the reductant passage line 129 (FIG. 1), the port 121, the passage 412, and the two high pressure ports 403 and 404 of the Venturi T connector 410, pulling reductant from the chamber 400 through the low pressure port 405. When the reductant in the chamber 400 depletes, ambient air flowing into the chamber 400 and then the passage 401 through the vent 416. Driven by the pump 200, the ambient air then purges the reductant residue in the pump 200 and the reductant passage lines in the supply path through the port 122 and return path through the port 121.

The reductant purging of the pump 200, and the reductant passage lines in the paths through the ports 121 and 122 starts after the purging of the buffer 206, the reductant passage line 131, the injector 130, and the reductant passage lines in the path through the port 411, since when the shutoff valve 204 is de-energized open, pulled by the reductant return flow from the high pressure inlet port 202 to the high pressure outlet port 201, reductant first flows through the buffer into the low pressure port 203 of the Venturi T connector 210. And only after the reductant in the chamber 400 is depleted by the supply flow to the pump 200 and the pulling flow created by the return flow through the high pressure ports 403 and 404 of the Venturi T connector 410, the air purging flow starts to enter the pump 200. After purging, the reductant residue is cleaned from the pump 200, the buffer 206, injector 130, and reductant passage lines. The pump 200 is then turned off, and the injector 130 is de-energized.

In FIG. 3 and FIG. 4, though the pressure relief valve 304 is not necessary, since the pressure in the buffer 206 can be maintained by the pump when the orifice size of the nozzle 302 is appropriate, it has a few benefits. One benefit is speeding up the pressure building process. When reductant pressure in the buffer 206 is lower than the threshold value of the relief valve, reductant pumped in the buffer can be "hold" until a pressure is established. As a result, the pressure building in such an apparatus is more efficient than the one without the relief valve, in which reductant leaks all the time.

The relief valve 304 can also help achieving a simpler pressure control and reserving electrical energy. Without the relief valve, a closed-loop pressure control is needed to adjust the pumping rate in real time to compensate for pressure change, and to maintain the dosing pressure, the pump needs to run all the time even when there is no dosing. With the help of the relief valve 304, however, if the threshold pressure is selected within the dosing pressure target range, then the pump only needs to run whenever reductant pressure is lower than the threshold. When reductant pressure is higher than the threshold, the relief valve releases the extra amount of reductant causing the high pressure. Therefore, as long as the relief valve is able to release the reductant in a timely manner, a good pressure control can be achieved. The pumping control in such an apparatus just needs to maintain a pumping rate within a range, the lower end of which is limited by dosing rate, and the upper end of which is determined by the relieving rate of the valve 304 and control performance requirements. A pressure feedback control is not necessary, though it helps in achieving a better control performance.

Furthermore, in applications with frequent stops and goes, the engine is keyed off frequently. As a result, without the relief valve 304, since the buffer 206 loses pressure quickly through the return loop, each time after a key-off and key-on, it may take a while before a pressure can be re-established even without purging. With the relief valve 304, however, the pressure can be hold. Thereby, by delaying purging, after a quick key-off and key-on, the reductant pressure can be recovered quickly. The quick pressure re-building decreases the chance without exhaust gas treatment control, and therefore, improves emission control performance in these applications.

Despite the benefits of the pressure relief valve, however, there is a safety concern. The relief valve prevents the buffer pressure from being released in case of emergency, when power is off or purging is not successful. In the present invention, this problem is solved by using the shutoff valve 204, which is de-energized open. In case of such emergency, when power is lost, the shutoff valve 204 is open, thereby releasing pressure in the buffer 206 through the low pressure port 203 and the high pressure port 201 of the Venturi T connector 210.

In the present invention, the reductant flow through the pump is always in one direction in the whole purging process, and there is no contact between the return flow and the pump 200. The avoidance of flowing return flow in the pump 200 solves the problem of hot-air caused pump damage, which is a major concern in a system with pump flow direction reverted during purging, and due to this concern, in such systems, purging has to be started after exhaust pipe cools down.

The structure of the apparatus in the present invention also enables simple purge control. Referring to FIG. 4, the purge control involves just energizing the pump 200 and the injector 130 for a period of time, while de-energizing the shutoff valve 204. The simple purge control further allows simple control algorithm or circuit, which facilitates emission control in applications with frequent and short key cycles, such as that in a vehicle with frequent stops and goes.

Normally purging can be triggered immediately at key-off. However, since each time after key-on, reductant pressure needs to be re-established in the buffer if it is purged, in a short key cycle, time may be too short to reach a dosing pressure. If the short key cycle happens too often, then the exhaust gas treatment system may have little chance to work, resulting in emission issues. To solve this problem, one method is to delay the purging trigger, so that a short key-off period won't trigger a purging.

The delay time for purging can be further adjusted according to engine operating status to decrease the unnecessary delay time and thereby draw less current from battery after key-off. If the engine is cold, it is less beneficial to trigger a long delay time, since reductant dosing is only allowed when engine is warm and exhaust temperature is higher than a certain threshold, and the chance of dosing in a cold key cycle is little. However, when the engine is warm, the chance for dosing should be better used and a longer delay time needs to be triggered. A variety of methods can be used in adjusting the delay time. One exemplary method is to use a timer with a compensation of engine oil or coolant temperature to create the delay time after key-off, while another simpler one is using the engine oil or coolant temperature directly to trigger the purging by comparing it to a threshold value.

Figure 5:
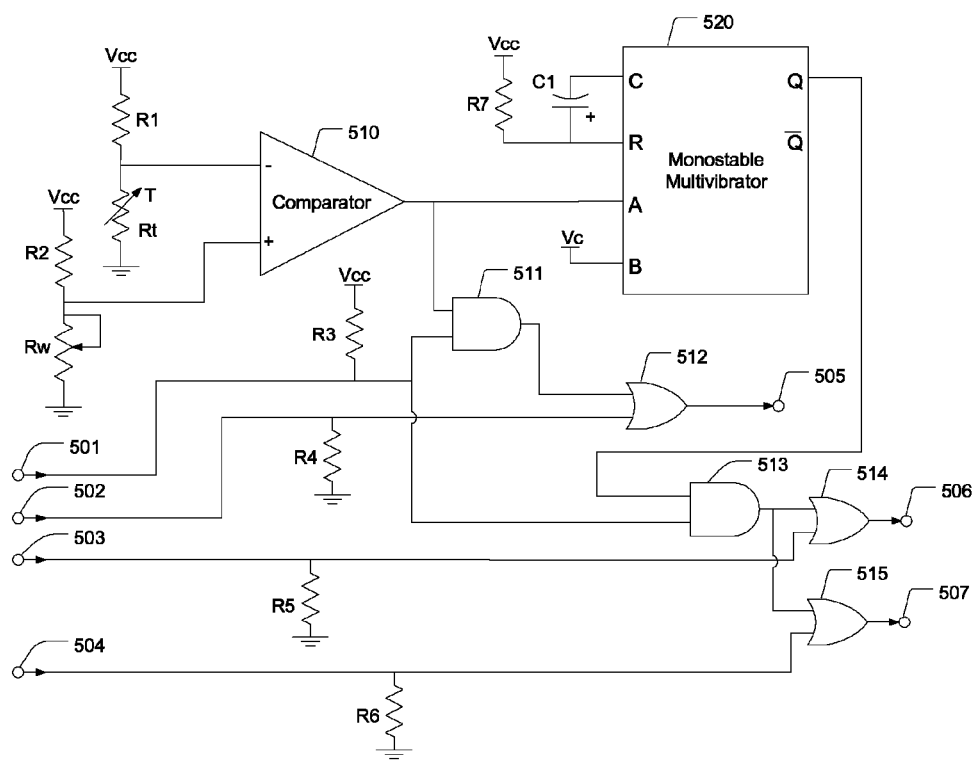
FIG. 5 is a circuit diagram of a purging controller that controls purging after a dosing process completes.

The delay control for purging can be realized using either an algorithm in the DCU 140, or a simple independent circuit, which is especially useful when the DCU has to be powered off upon engine key-off. An example of such a circuit is shown in FIG. 5. This circuit is for the simple control directly using engine oil or coolant temperature in triggering purging. It includes a comparator 510 for generating a trigger signal for purging, a monostable multivibrator 520 to generate a timing signal, two AND gates, 511 and 513, to control purge, and three OR gates, 512, 514, and 515, to generate control signals for the shutoff valve 204, the pump 200, and the injector 130, respectively. The comparator 510 has its negative input electrically connected to a pull-up resistor R1 and a pull-down engine oil or coolant thermistor Rt, and its positive input electrically connected to a pull-up resistor R2 and a pull-down potentiometer Rw. The ratio between resistance values of the resistor R2 to the potentiometer Rw determines a threshold value for triggering purging. When the resistance value of the thermistor Rt is higher than a threshold Rthd, i.e., when the engine oil or coolant temperature Temp is lower than the threshold Tthd set by R1, R2, and Rw, the voltage value at the negative input of the comparator 510, Vcc*Rt/(R1+Rt), is higher than that at the positive input, Vcc*Rw/(R2+Rw), and the voltage at the output of the comparator 510 goes low. A falling edge signal is thereby created. The output of comparator 510 is electrically connected to the A input of the monostable multivibrator 520 and an input of the AND gate 511, which has another input electrically connected to a pin 501 through a pull-up resistor R3. The falling edge signal at the A input of the monostable multivibrator 520 further triggers a pulse at the Q output. At the same time, the low voltage creates a low level input to the AND gate 511. The pin 501 is electrically connected to DCU as a signal input to enable purge control. When the voltage level at the pin 501 is high, i.e., the purge control is enabled or the DCU loses power, then at the output of the AND gate 511, a low level is created. The output of the AND gate 511 is electrically connected to an input of the OR gate 512, which has another input electrically connected to a pin 502 with a pull-down resistor R4. The pin 502 is electrically connected to the DCU to control a purge control valve (e.g. the shutoff 204 in FIG. 2). When the voltage level at the pin 502 is low, e.g., when the DCU loses power, then with the low level output signal of the comparator 510, the voltage level at the pin 505 is low, de-energizing the purge control valve. The Q output is electrically connected to an input of the AND gate 513, which has another input shares the connection to the pin 501, and the output of the AND gate 513 is electrically connected to an input of the OR gate 514. With a pull-down resistor R5, the other input of the AND gate 514 is electrically connected to the pin 503, which is electrically connected to the DCU to control the pump. When a low level voltage is at the pin 503, e.g., when the DCU loses power, the pulse at the Q output of the monostable multivibrator 520 creates a pulse control signal to a pump (e.g. the pump 200 in FIG. 2) at the output of the OR gate 514, which is electrically connected to the pin 506. Similarly, through the OR gate 515, which has an input sharing the connection to the output of the AND gate 513 with an input of the OR gate 514, and another input electrically connected to the pin 504 with a pull-down resistor R6, a control pulse is also generated to control an injector (e.g. the injector 130 in FIG. 2) at the output of the OR gate 515, which is electrically connected to the pin 507. The pulse width is determined by the resistor R7 and the capacitor C1, which are electrically connected to the R and C pins of monostable multivibrator 520 respectively. After the pulse, the pump and the injector are de-energized and the purging completes.

The control logic for the circuit of FIG. 5 is summarized in FIG. 6, in which "HZ" stands for high impedance, and "X" denotes any logic values. In the purging control circuit, the DCU totally controls the actions of the purge control valve, the pump, and the injector. The circuit only controls purging when the DCU is powered off (high impedance) or issues a high level signal to the pin 501, and low level signals to pins 502, 503, and 504.

In the circuit of FIG. 5, the pulse generated by the monostable multivibrator 520 is to control the pump running for a period of time and at the same time keep the injector open, so that reductant residue can be pulled back to the tank. In the dosing apparatus of FIG. 4, the purging time is determined by a variety of factors including the size of the buffer 206, the length of the reductant passages, the type and size of the Venturi T connectors 210 and 410, the orifice size of the nozzles 205 and 302, and the purging flow rate. The resistor R7 and the capacitor C1 need to be selected to provide appropriate purging time. To adapt the purging time to variations in the factors affecting it, the pressure in the buffer can be further used in determining the stop moment of the purging. For example, a delay timer, which is triggered after the buffer pressure drops below a threshold, can be used to stop purging.

While the present invention has been depicted and described with reference to only a limited number of particular preferred embodiments, as will be understood by those of skill in the art, changes, modifications, and equivalents in form and function may be made to the invention without departing from the essential characteristics thereof. Accordingly, the invention is intended to be only limited by the spirit and scope as defined in the appended claims, giving full cognizance to equivalents in all respects.

What is claimed is:

1. A dosing apparatus delivering reductant to an exhaust gas treatment system of an internal combustion engine, comprising:
   a Venturi T connector with a first high pressure port, a second high pressure port, and a low pressure port, at which a low pressure is created when a fluid flows through said first high pressure port and said second high pressure port;
   a buffer chamber fluidly coupled to said low pressure port of said Venturi T connector;
   an injector fluidly coupled between said buffer chamber and an exhaust line for controlling reductant dosing rate;
   a pump fluidly coupled to said first high pressure port of said Venturi T connector for supplying reductant; and
   a control valve fluidly connected to said second high pressure port of said Venturi T connector for controlling a reductant flow passing therethrough.

2. The dosing apparatus of claim 1, further comprising:
   a purge controller configured to operate said control valve open after a dosing process completes.

3. The dosing apparatus of claim 2, wherein said purge controller is further configured to operate said control valve open after a delay time since a dosing process completes.

4. The dosing apparatus of claim 3, wherein said purge controller is further configured to determine said delay time in response to one or a combination of sensing signals from a group of sensing signals indicative of operating status of said combustion engine including at least an oil temperature and a coolant temperature.

5. The dosing apparatus of claim 2, wherein said purge controller is further configured to drive said pump at a predetermined pumping rate and energize said injector open when operating said control valve open.

6. The dosing apparatus of claim 1, further comprising:
a nozzle fluidly connected to said control valve for limiting a flow rate of said reductant flow passing through said second high pressure port of said Venturi T connector.

7. The dosing apparatus of claim 1, further comprising
a nozzle fluidly connected to said buffer chamber for releasing reductant therein when a pressure is established in said buffer chamber.

8. The dosing apparatus of claim 1, further comprising
a pressure relief valve fluidly coupled to said buffer chamber, wherein reductant in said buffer chamber is released when a pressure in said buffer chamber is higher than a predetermined value.

9. The dosing apparatus of claim 8, further comprising:
a bypass check valve fluidly connected in parallel to said pressure relief valve to provide a path for a reverting reductant flow going into said buffer chamber.

10. The dosing apparatus of claim 8, further comprising:
a nozzle fluidly connected to said pressure relief valve for limiting a reductant low passing therethrough.

11. The dosing apparatus of claim 1, further comprising:
a pressure sensor for providing a sensing value indicative of a reductant pressure in said buffer chamber; and
a pressure controller configured to control reductant pressure in said buffer according to at least said sensing value obtained from said pressure sensor.

12. The dosing apparatus of claim 11, further comprising:
a purge controller configured to drive said pump at a predetermined pumping rate and energize said injector open when operating said control valve open, and de-energize said pump and said injector and operate said valve closed after a period of time since the moment when said sensing value obtained from said pressure sensor indicates said reductant pressure is below a predetermined value.

13. A dosing apparatus delivering reductant to an exhaust gas treatment system of an internal combustion engine, comprising
a Venturi T connector with a first high pressure port, a second high pressure port, and a low pressure port, at which a low pressure is created when a fluid flows through said first high pressure port and said second high pressure port;
a reductant return passage fluidly connected to said first high pressure port of said Venturi T connector;
a reductant storage chamber fluidly connected to said second high pressure port of said Venturi T connector;
a reductant supply chamber fluidly connected to said low pressure port of said Venturi T connector; and
a pump fluidly coupled to said reductant supply chamber for drawing reductant therefrom.

14. The dosing apparatus of claim 13, further comprising:
a control valve fluidly coupled to said reductant return passage for controlling a reductant flow passing therethrough.

15. The dosing apparatus of claim 14, further comprising:
a purge controller configured to operate said control valve open and drive said pump at a predetermined pumping rate after a dosing process completes.

* * * * *